(12) United States Patent
Kernodle et al.

(10) Patent No.: US 7,877,301 B2
(45) Date of Patent: Jan. 25, 2011

(54) SYSTEM AND METHOD FOR MANAGING MANUFACTURING, ORDERING, AND DISTRIBUTION IN A SUPPLY CHAIN

(75) Inventors: Joseph W. Kernodle, Seneca, SC (US); John S. Davis, Clemson, SC (US); John C. Peck, Seneca, SC (US)

(73) Assignee: Balancedflow Supply Chain Solutions, LLC, Seneca, SC (US)

( * ) Notice: Subject to any disclaimer, the term of this patent is extended or adjusted under 35 U.S.C. 154(b) by 279 days.

(21) Appl. No.: 11/397,951

(22) Filed: Apr. 4, 2006

(65) Prior Publication Data

US 2006/0282346 A1 Dec. 14, 2006

Related U.S. Application Data

(60) Provisional application No. 60/668,125, filed on Apr. 4, 2005.

(51) Int. Cl.
*G06Q 10/00* (2006.01)
(52) U.S. Cl. .............................................. 705/28; 705/8
(58) Field of Classification Search .................. 345/440; 705/1, 7, 8, 810, 26, 28
See application file for complete search history.

(56) References Cited

U.S. PATENT DOCUMENTS

| | | | | | |
|---|---|---|---|---|---|
| 5,369,570 | A | * | 11/1994 | Parad | 705/8 |
| 5,369,570 | A | * | 11/1994 | Parad | 705/8 |
| 5,479,343 | A | * | 12/1995 | Matoba et al. | 700/106 |
| 5,630,070 | A | * | 5/1997 | Dietrich et al. | 705/8 |
| 5,630,070 | A | * | 5/1997 | Dietrich et al. | 705/8 |
| 5,819,232 | A | * | 10/1998 | Shipman | 705/8 |
| 5,946,662 | A | * | 8/1999 | Ettl et al. | 705/8 |
| 6,073,107 | A | * | 6/2000 | Minkiewicz et al. | 705/7 |
| 6,151,582 | A | * | 11/2000 | Huang et al. | 705/8 |
| 6,205,431 | B1 | * | 3/2001 | Willemain et al. | 705/10 |
| 6,216,109 | B1 | * | 4/2001 | Zweben et al. | 705/8 |
| 6,272,389 | B1 | * | 8/2001 | Dietrich | 700/101 |
| 6,341,269 | B1 | * | 1/2002 | Dulaney et al. | 705/22 |
| 6,341,271 | B1 | * | 1/2002 | Salvo et al. | 705/28 |
| 6,393,332 | B1 | * | 5/2002 | Gleditsch et al. | 700/99 |
| 6,501,473 | B1 | * | 12/2002 | Hayes et al. | 345/440 |
| 6,516,301 | B1 | * | 2/2003 | Aykin | 705/10 |

(Continued)

OTHER PUBLICATIONS

Peoplesoft announces new sales and operations planning solution, Oct. 11, 2004, Business Wire.*

(Continued)

*Primary Examiner*—Matthew S Gart
*Assistant Examiner*—Talia Crawley
(74) *Attorney, Agent, or Firm*—John R. Perkins, Jr.; Nexsen Pruet, LLC

(57) ABSTRACT

The present disclosure relates to systems and methods for minimizing stock outs and costs by managing manufacturing, ordering, and distribution in a supply chain. In one embodiment of the present disclosure, a method for coordinating production across a supply network is provided. The method includes the steps of identifying one or more items in a supply network, identifying one or more constraints for such items in the supply network, identifying one or more strategic target buffers for such constraints, and generating make, order, and ship recommendations for one or more such items based upon one or more constraints and one or more strategic target buffers.

5 Claims, 4 Drawing Sheets

U.S. PATENT DOCUMENTS

| | | | | |
|---|---|---|---|---|
| 6,546,303 | B1* | 4/2003 | Fried et al. | 700/106 |
| 6,587,827 | B1* | 7/2003 | Hennig et al. | 705/26 |
| 6,611,816 | B2* | 8/2003 | Lebda et al. | 705/38 |
| 6,622,056 | B1* | 9/2003 | Lindell | 705/8 |
| 6,823,226 | B2* | 11/2004 | Clemens et al. | 700/99 |
| 6,922,676 | B2* | 7/2005 | Alnwick | 705/28 |
| 7,035,815 | B1* | 4/2006 | Henson | 705/26 |
| 7,058,587 | B1* | 6/2006 | Horne | 705/7 |
| 7,080,026 | B2* | 7/2006 | Singh et al. | 705/10 |
| 7,177,825 | B1* | 2/2007 | Borders et al. | 705/26 |
| 7,289,968 | B2* | 10/2007 | Ferreri et al. | 705/28 |
| 7,672,862 | B1* | 3/2010 | Venkatasubramanyan et al. | 705/8 |
| 2003/0014314 | A1* | 1/2003 | Griep et al. | 705/15 |
| 2003/0233262 | A1* | 12/2003 | Chorely et al. | 705/8 |
| 2004/0059627 | A1* | 3/2004 | Baseman et al. | 705/10 |
| 2005/0216372 | A1* | 9/2005 | Hessedenz | 705/28 |
| 2005/0222887 | A1* | 10/2005 | Mohan et al. | 705/8 |
| 2006/0048016 | A1* | 3/2006 | Reindler et al. | 714/47 |
| 2006/0059005 | A1 | 3/2006 | Horn et al. | |

OTHER PUBLICATIONS

Pinnacle consulting signs Alliance with Tamlin Software Developers, Aug. 21, 2000, Business Wire, pp. 0087.*

* cited by examiner

SYSTEM AND METHOD FOR MANAGING MANUFACTURING, ORDERING, AND DISTRIBUTION IN A SUPPLY CHAIN

The present application claims priority to provisional application U.S. Ser. No. 60/668,125, filed on Apr. 4, 2005, which is hereby incorporated by reference in its entirety.

BACKGROUND

In an effort to achieve optimal efficiency, entities seek to continuously reduce inventory, while still maintaining enough inventory to satisfy demand at any given time. Supply chain management is utilized to minimize costs and maximize performance with timely and efficient meeting of all demands.

Many current supply chain management systems employ reorder point systems or similar forecast-based scheduling systems that batch demand, resulting in demand distortion in the supply chain. Other "pull" or "just in time" systems lack coordination among supply chain activities and lack focus on maintaining appropriate days-of-supply of inventory. Thus, a system that triggers each supply chain activity to manufacture, order, or ship products that are in shortest supply, thereby avoiding stock outages while maintaining minimum inventory levels would be desirable.

SUMMARY

The present disclosure recognizes and addresses the foregoing needs and others with regards to supply chain efficiency. The present disclosure relates to systems and methods for minimizing stock outs and costs by managing manufacturing, ordering, and distribution in a supply chain. In one embodiment of the present disclosure, a method for coordinating production across a supply network is provided. The method includes the steps of identifying one or more items in a supply network, identifying one or more constraints for such items in the supply network, identifying one or more strategic target buffers for such constraints, and generating make, order, and ship recommendations for one or more such items based upon one or more constraints and one or more strategic target buffers.

In certain embodiments, the method may include the step of selecting one or more strategies for managing each constraint and utilizing make, order, and ship recommendations to effectuate such strategies. In some embodiments, the method may include the step of identifying one or more supply chain sections within the supply network, each such supply chain section including one or more upstream processes, and one or more non-strategic buffers. In certain embodiments, the step of identifying one or more constraints for items in the supply network may include identifying one or more constraints selected from batch size, available capacity, and upstream item availability. In certain embodiments, the step of identifying one or more items in the supply network may include identifying items by stock keeping units. In some embodiments, the method may include the step of calculating the capacity constrained requirement for one or more said items. In some embodiments, the method may include the step of calculating the batch constrained requirement for one or more said items. In some embodiments, the method may include the step of creating a demand forecast for one or more items to calculate days of supply for such items. In some embodiments, the method may include the step of displaying make, order, and ship recommendations on a secure Internet website. In certain embodiments, the method may also include the step of downloading make, order, and ship recommendations from the secure Internet website. In certain embodiments, the method may include the step of transmitting make, order, and ship recommendations via electronic means.

In another embodiment of the present disclosure, a method for synchronizing production across a supply network is provided. The method includes identifying one or more items in a supply network, identifying one or more constraints for such items in the supply network, identifying one or more buffers of the constraints, the buffers including one or more strategic target buffers, identifying one or more supply chain sections within the supply network, each supply chain section including a strategic target buffer, generating make, order, and ship recommendations for one or more such items based upon one or more constraints and one or more strategic target buffers, and selecting one or more strategies for managing each constraint and utilizing the make, order, and ship recommendations to effectuate the strategies.

In still another embodiment of the present disclosure, a system for synchronizing production across a supply network is provided. The system includes a computer capable of receiving one or more parameter values relating to one or more items in the supply network, utilizing one or more constraints from such parameter values, and generating make, order, and ship recommendations for one or more such items based upon the constraints.

DESCRIPTION OF THE DRAWINGS

A full and enabling disclosure, including the best mode thereof to one of ordinary skill in the art, is set forth more particularly in the remainder of the specification, including reference to the accompanying figures in which.

DETAILED DESCRIPTION

Reference will now be made in detail to the embodiments of the disclosure, examples of which are illustrated in the accompanying drawings. While the disclosure will be described in conjunction with the exemplary embodiments, it will be understood that they are not intended to limit the disclosure to these embodiments. On the contrary, the disclosure is intended to cover alternatives, modifications and equivalents, which can be included within the spirit and scope of the disclosure as defined by the appended claims. Furthermore, in the following detailed description of the present disclosure, numerous specific details are set forth in order to provide a thorough understanding of the present disclosure. However, it will be obvious to one of ordinary skill in the art that the present disclosure can be practiced without these specific details. In other instances, well-known methods, procedures, and components have not been described in detail as not to unnecessarily obscure aspects of the present disclosure.

In general, the present disclosure is directed to a system and method for improving manufacturing, ordering, and distribution in a supply chain or supply network (it should be understood that the terms "supply chain" and "supply network" can be used interchangeably). The present disclosure is a new approach to manufacturing scheduling and inventory replenishment. The system allows for application across a supply chain with synchronization of optimized production, replenishment, and shipping actions within single companies or entire extended supply networks. It should be understood that any suitable software, programming language, and/or hardware can be utilized to implement the present disclosure as would be known to one of ordinary skill in the art. In addition, any reference to uploading or downloading data as described hereafter assumes secure communication channels such as encrypted web pages via the internet can be utilized. However, not all such communications are required to be secured.

Figure 3A:
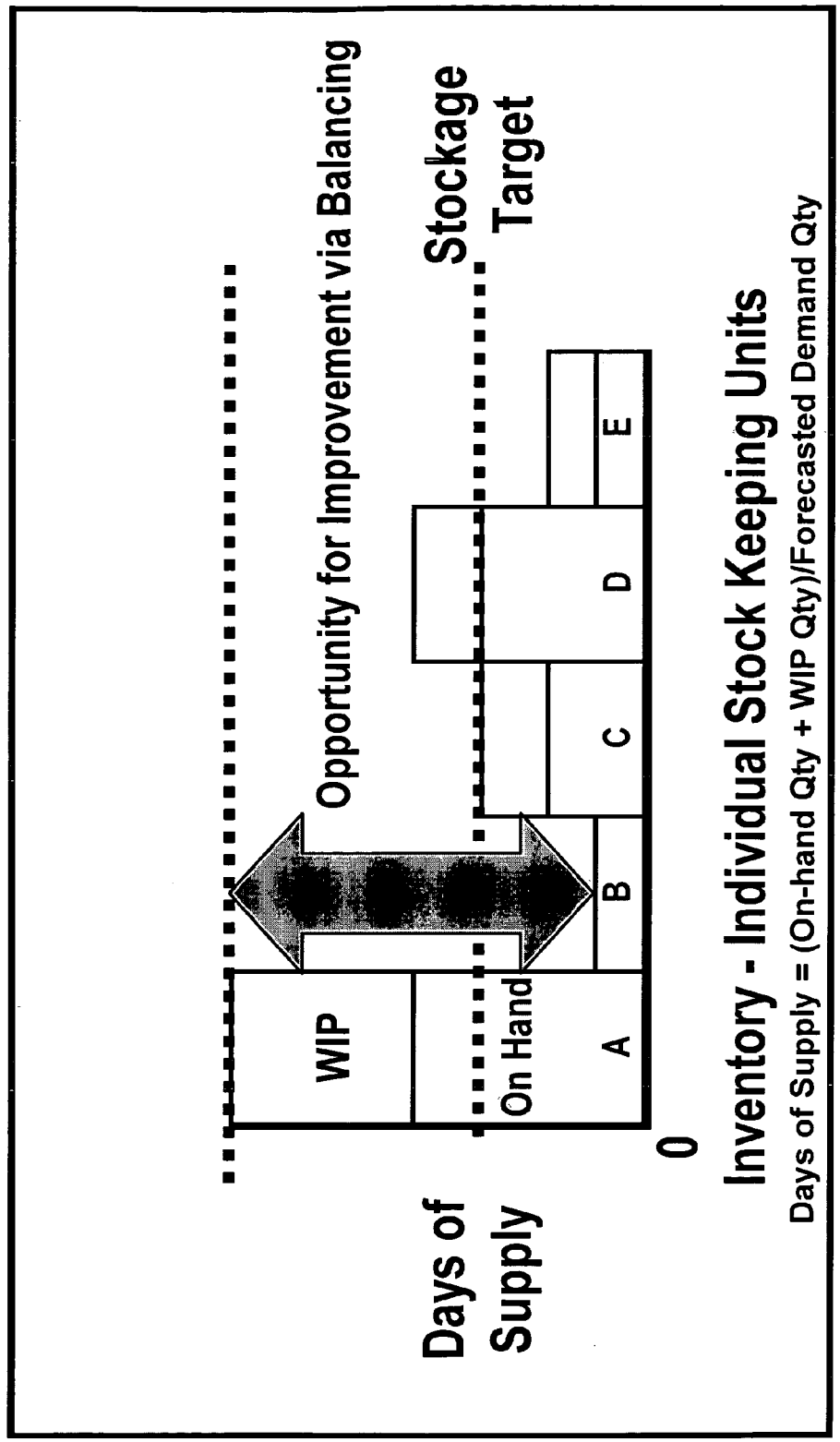
FIGS. 3A and B illustrate days of supply of product before and after implementation of one embodiment of the present disclosure.
Figure 3B:
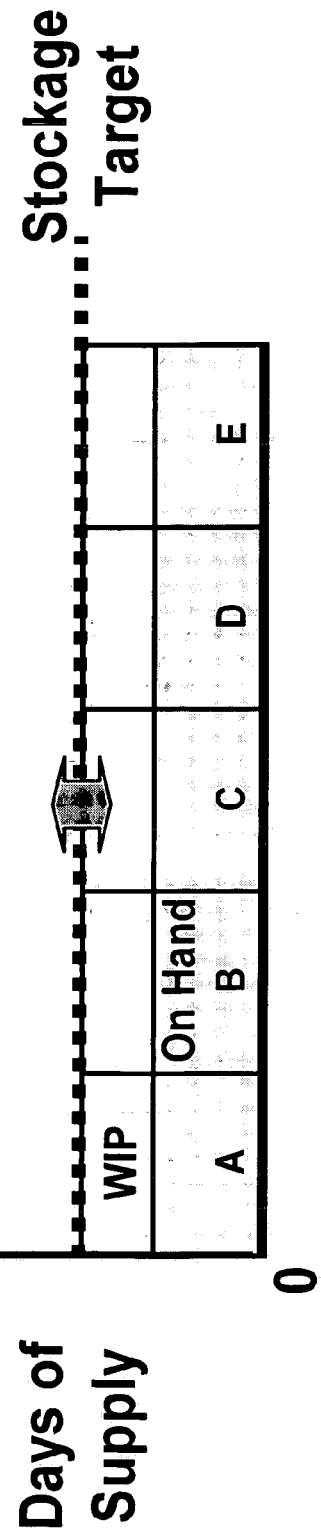

In accordance with one embodiment of the present disclosure, the system facilitates coordination among supply chain activities to maintain minimum stock outs and inventory levels. The system organizes a supply chain as an interacting set of supply chain sections (SC sections), each of which can contain a strategic buffer of inventory and one or more processes and non-strategic buffers as well as one constraint. In certain embodiments of the present disclosure, a buffer is an intentionally or unintentionally created inventory of items found between all processes within a supply network. Referring to FIGS. 3A and 3B, in some embodiment, the system objective is to maintain a user-specified inventory level in terms of days of supply at each strategic buffer and within each SC section in total.

The SC sections allow for mapping of entire extended supply chains into infinitely flexible, but standard (operate in exactly the same manner if output is ordering, shipping, or manufacturing) SC sections based on strategic buffers so that the system can be used to compute optimum quantities to order, ship and replenish for all supply chains or individual components of supply chains. Current software treats ordering, shipping, and manufacturing scheduling as three entirely different functions with different approaches and algorithms for each of the three types of functions.

In one embodiment of the present disclosure, the six operating parameters are used to optimize ordering, shipping, and manufacturing actions within the standard supply chain sections. The standard operating parameters within standard supply chain sections makes the system uniquely universal in application and simplicity. The six standard operational parameters are (1) strategic buffer targets in days-of-supply or quantities, (2) lead-times between strategic buffers, (3) transfer batch sizes in quantities, (4) the potential for one flexible constraint for each supply chain section and constraint values for each stock keeping unit (SKU) within each supply chain section, (5) expected yields for working losses, and (6) expected throughput times for each supply chain section.

The six operational parameters provide focus that enables efficient and effective collaboration by different divisions of a single company or as many different companies as want to work together for mutual benefit. The system computes order, ship, and make quantity requirements in SKU batches to maintain inventory balance in days-of-supply to established targets while honoring any type of constraints that limit performance.

The system distributes available upstream inventory automatically to downstream parts of the supply chain in a manner that keeps each downstream player balanced in days-of-supply to ensure no player runs out of stock. The system also utilizes constraints in each supply chain section to automatically limit the total quantity that can be ordered, shipped, or scheduled for production based on actual constraints. Constraints can be different to match whatever constraint exists for each supply chain section. Examples can include cash to spend, credit, cubic feet or weight, labor time, machine hours, or the like. The system also balances inventories across extended supply chains automatically in days-of-supply.

The system establishes simple and efficient secure and access-controlled communications of inventories, operating parameter values, and ordering, shipping, and manufacturing requirements between all local ordering, distribution, and manufacturing systems. This enables the file upload, or keying in of inventories from all local systems to one central database, display of total asset visibility across the extended supply chain, and makes output available automatically to each supply chain partner for download or electronic mail and execution in local systems. The system also eliminates forecasting and replenishment ordering which eliminates the need for generating an accurate forecast and eliminates the need for downstream customers to generate replenishment orders.

The system also utilizes serial numbers internally to identify supply chains, supply chain sections, process group codes, supply chain level stock keeping units, and supply chain section stock keeping units. This enables numbers and nomenclatures to be changed rapidly once each of these elements are created to provide flexibility.

Figure 1:
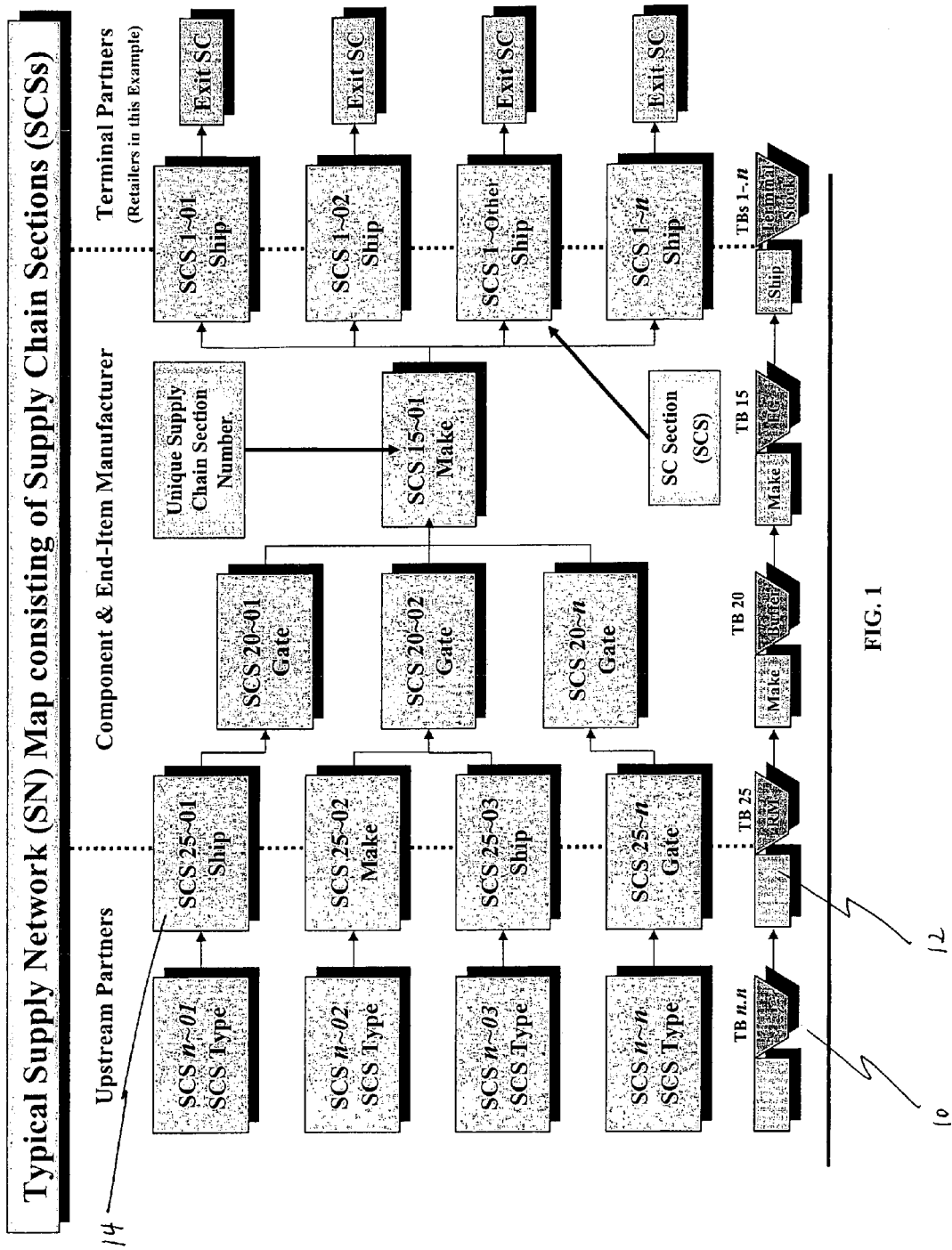
FIG. 1 is a supply network structure according to one embodiment of the present disclosure.

Referring to FIG. 1, in certain embodiments of the present disclosure, implementation of the system involves mapping the SC sections. A SC section is the primary operational unit of the system supply chain and consists of a gating process, followed by a series of processes and non-strategic buffers, and a strategic target buffer at the end of the series of processes and non-strategic buffers. As depicted in FIG. 1, a supply chain structure in accordance with one embodiment of the present disclosure is illustrated. If available, a detailed value stream map can be used as the baseline for mapping the system supply chain map. The map can be at the detailed supply chain segment level, which can easily be turned into a higher level system supply chain section map consisting of supply chain sections.

Mapping of the collaborative supply chain (the portion of the entire extended supply chain defined by the collaborative supply chain partners to be within their span of control for system implementation) begins downstream next to the external customer with a group of replenishable items (SKUs or part numbers). A group of SKUs will have stockage targets of zero (not stocked) or higher. The system begins operating at the terminal supply chain tier to determine the inventory required to fill shortages. The terminal supply chain tier contains the strategic buffer next to customers or consumers external to the collaborative supply chain.

While in some embodiments, non-stocked SKUs are handled by the system, replenishable SKUs should be stocked in the target buffers of the terminal supply chain tier to protect the constrained capacity within the upstream supply chain sections. Each strategic buffer is identified and mapped as shown by the trapezoids 10 at the bottom of FIG. 1. Strategic buffers are normally located just upstream of constraint or large bottleneck processes. In some embodiments, a strategic buffer is a buffer in the supply chain section having an important constraint. In some embodiments, constraint processes can be processes that exhibit the smallest gross capacities (or operational availability) over a moderate period of time such as a shift or day or week. The strategic buffers are connected with rectangles 12 indicating work-in-progress or work-in-transit and non-strategic buffers as depicted by the rectangles 12. These rectangles 12 represent lead-times and work-in-progress. Within each rectangle 12, one constraint is identified and designated as the constraint for the SC section for each run cycle of the software.

Rectangles 14 are drawn around each pair of trapezoids and rectangles as shown by the rectangles 14 to create SC sections. SC sections are placed in supply chain tiers based on product flow and as many peer level SC sections are drawn as necessary to include all of the players, processes, and products (SKUs) of the collaborative supply chain. Note that SC sections can span more than one supply chain tier as long as product flows downstream. Most SC sections are ship, constraint, or gate sections and such sections repeat up the supply chain tiers, but, in accordance with other embodiments of the present disclosure, there can also be other special purpose SC sections as well.

Often, two or more suppliers will provide the same item to downstream supply chain partners. Therefore, in certain embodiments, the system of the present disclosure provides the capability of "allocating" a percentage of the need to each upstream supplier.

In some embodiments, initial lead-time objective days, and target buffer objective days of supply are determined and combined to create the supply chain stockage objective. Lead-time objective is the time normally in days required to produce or to ship a batch of items across all the processes and non-strategic buffers within a SC section. This is commonly referred to as the operating level requirement in traditional replenishment where it is the product of the policy replenishment lead-time days multiplied by the policy demand rate per day. Replenishment lead-time refers to the time the downstream process owner has to wait for order fulfillment once a replenishment order is generated. All variation in lead-time not included in the lead-time objective value should be covered by safety stock located in the target buffer of the SC section or stock outs will result. In some embodiments, the target buffer objective can be the sum of the operational variation and the surge objectives. The target buffer objective should contain sufficient stockage to cover upside customer demand variation, upside lead-time objective variation not included in the lead-time objective value, and any event-driven surge objective to eliminate downstream stock outs. Current policy values are normally optimum starting points.

Figure 2:
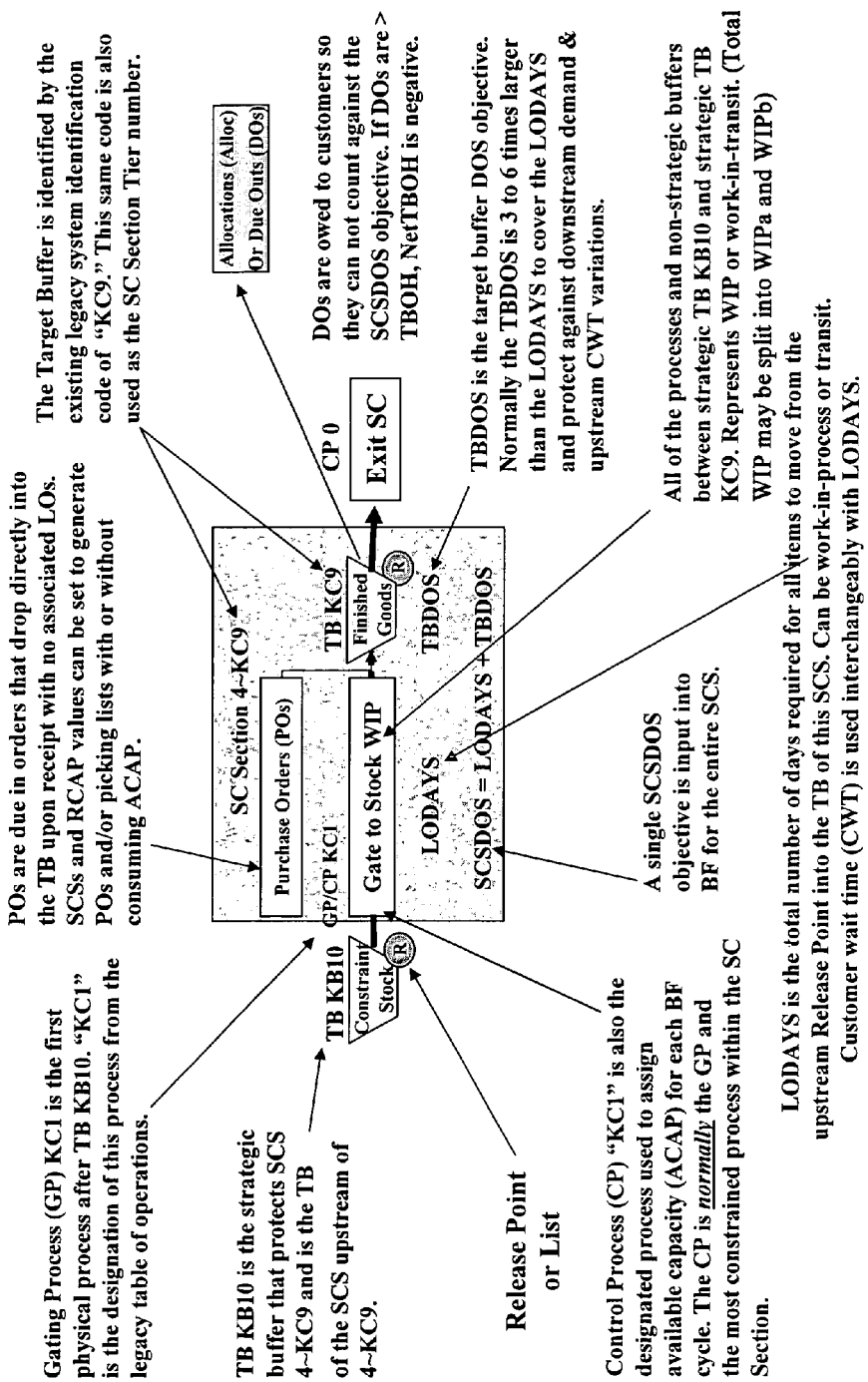
FIG. 2 illustrates supply chain section components according to one embodiment of the present disclosure.

Referring to FIG. 2, SC section components in accordance with one embodiment of the present disclosure are illustrated. Inventory capture requirements are indicated by the lower arrow heads in the product flow indicator arrows. Product movement should be captured between SC sections and movement from work-in-progress into the target buffer should be captured for optimum results. The target buffer is the strategic buffer of inventory located at the end of each SC section. It can contain a minimum, but sufficient inventory to protect against surge requirements, variations in customer demand, replenishment lead-time, and variations in replenishment lead-time. It also normally contains excess inventory generated by batch sizes larger than needed immediately. If work-in-progress and target buffer inventories cannot be separated, all SC section inventories should be reported as being in work-in-progress.

In some embodiments, SC section names consist of a supply chain tier number, a tilde, and a supply chain tier section number as shown in FIG. 2. Supply chain tier numbers indicate the SC section's location in the supply chain. Low integers are utilized for the terminal tier and ascending integers are assigned to upstream tiers. Numbers downstream of the terminal supply chain tier and between upstream tiers are skipped (i.e. initial mapping) to permit the future addition of new supply chain tiers without having to change the original supply chain tier numbers. Tildes (~) can separate the supply chain tier numbers and the SC section tier section numbers. Supply chain tier section numbers are normally short names that uniquely identify each SC section within the supply chain tier.

Due outs are owed to customers so they cannot be used to meet the SC section objective. If Allocations are greater than target buffer on hand, the net target buffer on hand is negative. In some embodiments, target buffer on hand can be the days of supply or quantity on-hand in the target buffer of a SC section. Target buffer objective is the target buffer days of supply stockage objective. In some embodiments, the target buffer objective is three to six times larger than the lead time objective days so as to cover the lead time objective and also protect against downstream demand and upstream lead-time variations.

Gate to stock work-in-progress includes all of the processes and non-strategic buffers located between strategic buffers. This would be work-in-transit for shipping SC sections.

Lead-time objective is the total number of days required for all items to move from the upstream strategic buffer release point into the strategic buffer of the SC section. It can be work-in-progress or in-transit or purchase order lead-time. Customer wait time is used interchangeably with lead-time objective as it is a more precise description because lead-time objective actually begins when the need to move product downstream is recognized. Included is the time required to transmit the demand signal and the production backlog time between demand signal receipt and the beginning of production.

In some embodiments, the SC section days of supply objective is entered into the system to cover the sum of lead-time objective and target buffer objective. The target buffer objective is actually established to cover the lead-time objective, but, in some embodiments, the system shows them separately to focus on the importance of and connection between lead-time and strategic buffer management. As system cycle is the frequency of running the system and frequency can be any period of time such as hourly, daily, weekly, etc.

Referring again to FIG. 2, control process is both the gating process and control process for the illustrated SC section. In some embodiments, the gating process is the first physical process in a SC section. The control process is normally the first physical process in a SC section and is often the most constrained process. The control process can be used as the basis of assigning available capacity for each system cycle. Available capacity refers to the capacity of each SC sections' constraint or control process promised for the next system run cycle. Units of measurement are the same as used for required capacity values (described more fully below) of each SKU.

Release point recommended picking lists are generated for local supply sources. In some embodiments, local systems should generate picking lists from the system output if bills of materials are used outside of the system.

The strategic buffer upstream of the supply chain depicted protects the SC section and is the target buffer of the SC section upstream of the SC section depicted. In some embodiments, purchase orders are generated by the system for non-collaborative supply sources or the downstream SC section owner elects to generate replenishment quotas. Purchase orders and picking lists can be generated in various ways based on allocations to upstream SC sections. In some embodiments, legacy systems generate purchase orders if bill of materials are required. Purchase orders as shown in the rectangle are total due in orders that drop directly into the target buffer upon receipt. Virtual SC sections can be created and required capacity values can be set to generate purchase orders and/or picking lists with or without consuming available capacity. Required capacity refers to the amount of constraint, control point, or SC section capacity required by each SKU.

In some embodiments of the present disclosure, a pilot project is conducted so that the supply chain partners can learn how to implement the system. The pilot normally consists of all the SKUs that are interchangeably made on a single production line to demonstrate the power of optimizing changeovers in the synchronized supply chain. However, a virtual supply chain can be created within an existing supply chain by reserving a fixed percentage of total capacity of every process for use only by the pilot project. The selected SKUs should be in production long enough for all stakeholders to move up the learning curve. The pilot supply chain should consist of sufficient supply chain sections to include one manufacturing section that uses a bill of materials, one section that generates purchase orders, and one shipping section to demonstrate the most complex situations.

The system of one embodiment of the present disclosure is designed to enable a supply chain administrator to map the supply chain as previously described and to create and edit the supply chain. In addition, the supply chain administrator authorizes access for individual supply chain managers.

In some embodiments, each supply chain manager follows several steps to fully utilize the system. Supply chain managers edit values in the system. This can include supply chain name, date of the last balance across the supply chain, start date of computed forecasts, maximum SC section tier levels, and last upload date of SC section SKUs across the supply chain. Supply chain managers also load supply chain SKUs and supply chain bill of materials into the system. In some embodiments, this is done by uploading a CSV (comma separated value) file. Supply chain managers create new SC sections and remove SC sections. In some embodiments, when all individual SC sections have been balanced to allocate shortages downstream in a balanced manner, the system computes the downward allocations of ship and order quantities. Strategies for such scheduling are discussed in greater detail below.

In addition, the system can calculate upstream demand. In some embodiments, the system requires an annual demand forecast and launch forecast for every active SKU in each SC section. In some embodiments, supply chain sections in the terminal supply chain tier have externally generated demand forecasts. Supply chain sections in upstream supply chain tiers can have either externally generated demand forecasts or forecasts calculated by the system from downstream forecasts. Strategy for such forecasting is discussed more fully below. In some embodiments of the present disclosure, there are also optional ways to create an external demand forecast. In certain embodiments, launch forecasts are used as the basis for calculating the upstream demand forecasts, to generate the availably capacity requirements for planning, and for balanced scheduling.

Forecasting Strategy (Pull and Push Integration)

In some embodiments, the system uses an optimum pull-push scheduling strategy while synchronizing the entire collaborative supply chain, thereby trivializing the impact of forecast error and providing a number of additional benefits.

In some embodiments, pull based scheduling is preferred over forecast based scheduling because of risk reduction (sales are not missed, safety stocks needed to cover demand and forecast variations are minimized, expediting is minimized, and cash flow is not delayed). Inventory initially can be deposited in the terminal supply chain buffers next to consumers based on a SKU-level forecast because consumers prefer instant gratification rather than ordering and waiting. Pull scheduling should then be used for replenishment, but push scheduling is still needed for two supply chain optimization roles.

Such capacity planning requires a high-level forecast (higher than SKU-level) to establish capacity before pull scheduling can be executed at the SKU-level because capacity cannot be created or eliminated fast enough to react to pull demand. Planning establishes sufficient available capacity for constraint processes up the entire supply chain to meet the expected demand over time. It also creates sufficient early manufacturing of safety stocks to cover shorter-term periods of high demand.

In addition, SKU-level forecasting can protect customer stockouts and protect supply chain constraint processes. The pull strategy should be used across the entire supply chain frequently to synchronize product flow at the SKU level through replenishment, shipping and manufacturing processes. Consumer demand is variable and short-term demand does not usually match short-term available capacity so at least three options are available:

Stock outs or customer wait times are accepted, risking the loss of revenue and future sales except when consumers are willing to wait.

Safety stocks are pre-positioned to prevent stock outs.

Capacity changes are used to prevent stock outs.

A combination of the three options is common, but the complete elimination of stock outs and protection of established available capacity through safety stocks is typically the most profitable strategy. The system requires fewer safety stocks than traditional methods because the system uses pull strategy frequently to synchronize the entire supply chain and maintains inventory balance in days-of-supply. Safety stocks are not necessary for the portion of the schedule that is based on pull demand.

In some embodiments, when daily demand is below the planned available capacity, the full available capacity should be launched or downstream inventories will drop below planned levels and additional unplanned available capacity will be needed later to make up the shortages. In this situation the system uses the forecast to launch additional low-risk SKU quantities by priority to serve as safety stocks. When pull exceeds the planned available capacity, the safety stocks become a second source of supply to protect the upstream manufacturing and shipping constraints. Thus, both the forecast and a small quantity of safety stocks are important not only to protect consumers from stockouts, but more importantly to protect the constrained manufacturing and shipping processes from costly unplanned capacity changes.

Another component of safety stock is driven by large replenishment order batches (that become demand variation from the manufacturers' viewpoint) and large production order batches in manufacturing (viewed by the customer as replenishment lead-time variation). This is discussed in more detail below.

Thus, the system flips the standard push scheduling paradigm upside down. The items in shortest supply are scheduled first through pull and, when necessary, the most desirable forecast is picked to finish loading the schedule to the planned level with items next in shortest supply. Stated differently, expediting occurs frequently and automatically across the collaborative supply chain to eliminate the normal customer-driven physical expediting that occurs in all forecast-driven scheduling systems. Scheduling to a forecast and reaction to current customer needs by expediting is no longer needed.

The supply chain is not driven from the traditional concept of point of sale (POS) demand that is based on "sell-one, make one." Instead, pull originates from the terminal buffers next to external customers. There are at least two distinct advantages to this. First, the terminal supply chain partner can change the stockage objectives of the buffer throughout the year in weekly buckets based on current knowledge and the system will respond accordingly automatically. Second, the pull signal sent to manufacturing is leveled even more because it is a combination of direct consumer pull plus dampened pull to replenish the buffers that were drawn down when demand was above average expected demand.

This approach of buffering the manufacturing and distribution constraints is valid all the way up the supply chain. This scheduling approach is built on the constraints management scheduling concept for a single manufacturing line known as drum, buffer, and rope. The drum is the frequent (daily, weekly, or monthly) signal of terminal buffer shortages. There is a strategic buffer upstream of each constrained process to protect each constraint. The system release list submitted to each strategic buffer across the entire supply chain upstream of the terminal buffer is the rope or schedule that ties the release of the items in shortest supply to the drumbeat of daily pull demand. Downstream safety inventory protects both external customers from stock outs and upstream manufacturing constraints from excessive demand swings and associated high operating expenses.

Thus, it is actually desirable to make and stock sufficient quantities of all items to protect against consumer level stockouts plus a sufficient mix and level of low-risk items to protect from costly manufacturing capacity changes. Finally, these buffers should be stocked as far upstream as possible to minimize the money invested in them while they protect manufacturing and distribution constraints and provide flexibility in meeting downstream need.

The system optimizes the mix of push and pull scheduling all the way up the collaborative supply chain in order to achieve the goal of maximizing profits by multiplying revenue and minimizing costs for all supply chain partners across the entire supply chain.

Scheduling Strategy

Although balancing cycle and batch size strategies are discussed above, the frequency of balancing determines the system cycle and a daily cycle is normally optimum and realistic because most legacy systems update inventory status in a batch mode only once a day. In some embodiments of the present disclosure, the system honors the constraints of batch sizes and available capacity within each SC section as follows:

Net SC section shortages—the system first computes the target and net shortage quantities for each SKU.

Batch constrained requirement—the system computes the batch constrained requirement quantity to fill the shortage in full lowest batch quantity and batch increment quantity increments. The batch quantity is the lowest batch quantity for the first allocation to each SKU and the batch increment quantity for each subsequent allocation. The batch constrained requirement is only constrained by lowest batch quantity and batch increment quantity parameter values plus the batch rounding.

Capacity constrained requirement—the system next computes the available capacity constrained requirement quantity by allocating a batch quantity to the SKU with the lowest on-hand days of supply inventory status and subtracting the sum of the allocated batch quantity and the required capacity value from the available capacity value. The system repeats this loop until either the SC section objective quantity is reached or the available capacity is consumed. In some embodiments, the system consumes all available capacity. The output is the capacity constrained requirement which is constrained both by batching rules and by the available capacity parameter value.

Override the SC section stockage objective—the system is able to consume all available capacity without stopping when the SC section objective is reached.

Downstream Allocation (across the supply chain)—the system addresses the third and final constraint of upstream supply availability with downstream allocation discussed previously. In some embodiments, such an option would be utilized after all the SC sections are individually balanced. It allocates downstream according to priorities chosen by each upstream SC section manager. This priority should be done proportional to downstream need.

In some embodiments of the present disclosure, the system allows for viewing and downloading of a report which can optionally contain information input into the system as well as information calculated by the system. In addition, in some embodiments, graphical representations of such information can also be downloaded for viewing. Optionally, in some embodiments, such information is sent by electronic mail.

Balancing Synchronization Across the Supply Chain

In some embodiments, balancing is conducted by both SC section managers and the supply chain manager for each system cycle. The system balances first within each SC section to the constraint of each SC section and then balances the release of upstream inventories when there are shortages to ensure as many downstream SC sections as possible remain in stock. A suggested balancing strategy is to balance daily each supply chain tier in ascending tier number order by a set time and complete the sequence by balancing the entire supply chain at the set completion time.

Batch Size and System Cycle Strategy

In traditional supply chains, optimum batch sizes are determined by considering acceptable stock out rates (or acceptable customer wait times), the cost of owning inventory, and changeover costs from one product to another. The system totally eliminates the variable of acceptable stock our rates since it eliminates stock outs of replenishable items. This leaves only two of the three variables to consider when determining optimum batch sizes. On the other extreme is the lean approach of moving to a batch size of one for discrete manufacturing. In discrete manufacturing processes, one item is made at a time in contrast to process manufacturing in which two or more items are made at the same time. Minimizing batch sizes is more difficult for process than discrete manufacturing because physical batch sizes should be reduced in addition to the elimination of changeover time. However, it is clear that optimum batch sizes are much smaller than most shippers and manufacturers currently use, but seldom is a batch size of one optimum for replenishable SKUs.

In some embodiments, an optimum batch size can be one day-of-supply. If every process ordered, shipped, or produced one day-of-supply of every SKU every day, the operational quantity in every strategic buffer would be one day-of-supply. Thus every transfer batch and buffer greater than one day-of-supply is an opportunity for improvement by reducing demand variation, replenishment lead time variation and their primary driver of large batches. There is a direct relationship between batch sizes and downstream inventory accumulation and batch sizes can only be reduced economically after changeover costs are reduced.

In some embodiments, if changeover times are reduced by x percent on the constraint process, batch sizes can be reduced by x percent with no available capacity loss (except for any partially empty constraint machine capacities resulting from the reduced batch sizes); reduce work-in-progress and production lead time by x percent with no increased operating costs; reduce downstream inventory by x percent with no increase in stock outs; and respond to pull demand x percent faster with more choices from raw materials.

In some embodiments, changeover times can be reduced on bottlenecks other than the current constraint to enjoy the above benefits because they can become batch-sized constrained when batch sizes are reduced on larger bottlenecks. This is the "batching constraint" shown as batch constrained requirement. Batch constrained requirement is the quantity required to reach established target levels within the SC section. It is constrained only by lowest batch quantity, batch increment quantity, and batch rounding rules.

In some embodiments, the is a highly important action that can be undertaken because the opportunity (as measured by inventory and batch sizes greater than one day-of-supply) is huge and batch size reductions immediately and directly multiply benefits that contribute immediately to the goal of maximizing profits by multiplying revenue and minimizing costs for all supply chain partners across the entire supply chain.

In some embodiments of the present disclosure, the system can be used to automatically launch optimum batch sizes as follows:

Use constraints management to identify the major bottlenecks within each SC section and a constraints-based effort to minimize changeover times so batch sizes can be reduced without adding costs or reducing capacity.

The system should be implemented using current batching policies. This permits the attainment of SKU balance without impact on the production floor, but introduces the concept of flexible batch sizing through lowest batch quantity and batch increment quantity SKU parameters. Lowest batch quantity refers to the smallest quantity of a SKU that can be released/ordered and batch increment quantity refers to the quantity increment multiple that can be released for processing after the lowest batch quantity is released. This, in turn, reinforces the need for minimizing batch sizes on the production floor and in shipping. In some embodiments, computations are done outside of the system to determine the optimum batch sizes based on current changeover costs (including lost capacity) and downstream benefits.

In some embodiments, daily cycles are optimum because most companies only do daily batch inventory status updates after which status can be submitted to the system. In addition "take away" or shipping normally occurs only once a day. If orders are received only once a day or take-away occurs only once a day, batch sizes less than one day of supply are unnecessary because waste in the form of excess capacity would have to be maintained to accommodate the needless changeovers. If either order receipt or take away occurs less frequently than daily, the most constrained interval determines the optimum batch sizes. If both order receipt and take-away are in real time, actual batch quantities of 1 can be optimum (cycles can be for any period of time).

Couple this batching strategy with the strategy of stocking the fastest moving SKUs and making to order the slowest moving SKUs for optimum overall performance. Finished goods and manufacturing capacity both become supply sources. When customer demand for slow-moving SKUs exceeds established available capacity, the finished goods inventory protects from having to adjust capacity. When fast moving SKU demand drops below established available capacity, the system launches optimum quantity replenishment batches of stocked finished goods to minimize changeovers and maximize capacity. Determining the break point between fast-moving and slow-moving SKUs is done outside of the system based on the cost of flexible capacity and the relationship between the cost of manufacturing versus the cost of end-item components.

Capacity and Work in Progress

In some embodiments of the present disclosure, the SC section boundaries can be modified when appropriate and several different constraints-based strategies for assigning available capacity and required capacity values for replenishable and non-replenishable items can be utilized. Such strategies can be employed as the situation within a SC section changes or they can be used to realize immediate benefits while work (such as capturing inventory movement in work-in-progress and target buffer increments) is undertaken to enable transition to a better strategy.

In some embodiments, the largest bottleneck is the current constraint and the normal method of determining the largest bottleneck processes is to look for the largest quantity of inventory that exists because the items can not move through the next process. However, care should be exercised in this simple approach. Often, large batch policies cause an upstream processes to be the true constraint, but the large batches accumulate behind downstream bottlenecks creating the appearance that the second largest bottleneck is the constraint. In fact, a large batch policy is often the core problem that manifests itself through high demand and replenishment lead-time variations! When the location and nature of the constraint is determined, chose the most appropriate following strategy for managing the SC section's constraint:

The Natural Constraint Strategy

In some embodiments, the ideal situation is to map the supply chain so SC section boundaries exist between constrained processes and their supporting strategic buffers. In most supply chains, the SC sections will naturally split upstream of each section's natural constraint. In some embodiments, the natural constraint can be the bottleneck at which it would cost the most to purchase one step up in capacity (If the natural constraint is not the current constraint of the SC section or is not fixed in place, there should be an objective of promoting it and fixing it in place so the SC section owner can optimize performance easily). When the natural constraint is fixed in place as the gating process, the releases from the upstream buffer go almost immediately onto and across the constraint and are counted as work-in-progress a (WIPa) inventory upon release. WIPa is work that is in process or in transit within a SC section between the release from the upstream target buffer and the target buffer of the current SC section. If used in conjunction with WIPb (work that has been removed from the upstream target buffer, but has not yet been processed by the gating process of the SCS), WIPa is the work-in-progress that is being processed by the gating process plus the work that is between the gating process and the target buffer at the end of the SC section.

The SC section supervisors should simply maintain sufficient protective capacity before and after the constraint process to maintain this stability. Most importantly, the available capacity value applies to the gating process and the required capacity units of measurement do not change. The natural constraint is either the first process within each SC section or can be promoted and fixed in place as the first process in the vast majority of SC sections. This approach also works when multiple bottleneck processes are so nearly balanced that constraint wandering causes no significant capacity changes and one of the bottlenecks is the gating process.

The Control Point Strategy

In some embodiments, the SC section's constraint cannot or should not be made to be the gating process. If the constraint moves from bottleneck to bottleneck with product mix changes, generating available capacity values and handling work-in-progress values becomes more complex and resource intensive. If the constraint moves about, the available capacity and required capacity units can have to be changed each time that it moves and this is not feasible on a daily basis when there are many SKUs. In addition, there may be insufficient space to create an adequate strategic buffer immediately upstream of the constraint or it may not be feasible for other reasons to create and maintain a buffer just upstream of the constraint process.

New work released to any gating process will accumulate for most of the system cycle at the gating process. This is because the amount released is for a full cycle and thus too large to immediately pass through most gating processes. However, when the gating process is designated as the control process and is not the constraint, all of the release should pass through before the end of the system cycle and the control process should be idle at the end of the system cycle. When the constraint is a few processes downstream of the strategic buffer, the complete amount released may not clear all of the processes upstream of the constraint and can require available capacity in the next system cycle. In other words available capacity has been assigned and consumed, but the work still should go through the constraint and consume available capacity in the next system cycle. In addition, this work could be set aside to let higher priority work pass by. In such embodiments, the control point strategy can be utilized to manage this situation.

A SC section supervisor should have a basic understanding of constraints management to utilize the control point strategy. The gating process is designated as the control point and the available capacity values are based on the control point, eliminating the need to change the required capacity units when the constraint is not the control point. The SC section supervisor should know were the constraint is currently located and how the capacity of the current constraint relates to the capacity of the control point. Then the supervisor observes the work-in-progress inventories upstream of the current constraint and quickly determines a new available capacity value for the control point that will protect the constraint, but not permit the buildup of inventory upstream of the constraint. The units of measurement for the control point's available capacity remain constant and the supervisor reports the available capacity of the control point in values that relate to the actual capacity of the SC section. Supervisors learn very quickly how to best determine available capacity values and use the output of the system to significantly improve work assignments, workflow, and throughput times.

The Balanced Team or Process Strategy

In some embodiments of the present disclosure, no constraint can be identified within the SC section because the SC section is balanced or the SC section team members are sufficiently flexible to maintain balance. In such embodiments, the total available SC section work-time available for the next system cycle can be assigned as the available capacity value and the total standard allowed hours required to produce each SKU can be used as the required capacity values. Standard allowed hours refers to the standard allowed time in hours for a SKU to cross a single process or all processes where summed. Item costing, production operator pay, and production scheduling are normally based on these standard times.

This is also an acceptable temporary approach even if the processes are not balanced and teamwork does not maintain a balance. It is a large improvement over normal manufacturing line chaos and is appropriate until a constraint or control process can be established. Another reason for using this approach is to make improvements while building teamwork or installing technology in the SC section. However, this should be a temporary stage because it does not optimize performance.

The Work In Progress B (WIPb) Strategy

In certain embodiments of the present disclosure where the above strategies are not sufficient to optimize throughput, the system has still an additional tool named WIPb. WIPb permits the splitting of the work-in-progress within a SC section into two components (work in progress a (WIPa) and WIPb). As described previously, in some embodiments, WIPb can be the work that has been released from upstream strategic buffers, but has not passed through the constraint process at the end of the system cycle. Available capacity is not reserved for, assigned to, or used by WIPb. There are at least two situations which can be appropriate for WIPb:

If WIPb inventory is significant and irrevocably committed to the constraint process, the SC section supervisor should estimate the amount of available capacity that has been released, but not yet passed through the constraint process. This amount of WIPb available capacity should be subtracted from the total available capacity before the available capacity is posted to the system for the next cycle. An example of the valid use of WIPb is weaving when warp beams loaded on a loom can represent days of loom weaving time before the product becomes WIPa.

If WIPb inventory is significant, but not irrevocably committed to the constraint process, first verify that it would not be easier to modify the SC section boundaries or to create another SC section rather than employ WIPb. If another SC section cannot be created, the SC section supervisor should manage WIPb as above, but traditional expediting can still creep back in for the processes covered by the WIPb inventory.

This WIPb strategy can work when newly released work is dropped from visibility, when it is a significant amount of work for the control process, and when the supervisor cannot adequately estimate the amount of available capacity for the control process based on the current location of the constraint.

The Engineer To Order Strategy

In certain embodiments, an engineer to order (ETO) strategy is employed. There are at least three options for scheduling ETO items (a customer order for a non-standard, non-stocked item that should be created through re-engineering of an existing item or a complete new build):

Reserve an appropriate amount of available capacity and keep it outside of the system for ETO items so they can be produced totally outside of the system. This is the appropriate strategy for any SC section in which the work required to populate the system is greater than the ensuing system benefits.

Create one standard SKU named "Engineer to Order" and estimate a standard or variable total required capacity value that can be input for each system cycle along with the available capacity.

Fully load each job order into the system either using a standard set of SKUs that is sufficiently large to cover the majority of possible jobs or fully load each individual job order when the estimate is conducted. The system can then generate component orders and generate work schedules in a balanced and optimum manner. In some embodiments, this is the appropriate strategy for scheduling job shops. In some embodiments, a local paperless program can electronically post work order requirements to local systems and the system immediately upon approval.

Days of Supply and EOD Stockade

Days of Supply

In some embodiments, the supply chain partners input into the system one SC section days of supply objective (SCSO) that applies to all SKUs within the SC section except for those with end of demand curve override values. End of demand values are primarily used to indicate non-stocked SKUs (i.e., end of demand=0) or very low demanded SKUs to keep stockage quantities fixed at or near zero.

Normally current stockage policies provide for far more inventory and lead-time than will eventually be needed with the system. However, the following paragraphs describe the decision making process in determining appropriate initial SC section objectives.

In some embodiments, the supply chain partner determines first the appropriate lead time objective so that sufficient time is allowed for all items to move through production backlog queues and production or transit times from the upstream target buffer into the target buffer of the downstream SC section. The lead time objective time begins when the signal that replenishment is needed is generated and ends when the new items are deposited into the downstream target buffer. This includes sufficient time to transmit the orders, wait through the upstream backorder queue, pick the new releases, move them through work-in-progress to the constraint process, constraint processing time, and time for the downstream processes to deposit the items into the SC section's target buffer. The lead time objective should not be the average time, but the full amount of time to enable virtually all orders to arrive.

Next, a target buffer objective is estimated to cover the lead time objective plus the upside variations in customer demand and replenishment lead time. Again, existing stockage policies are normally more than sufficient. However, the initial target buffer objective can be at least six times the lead time objective to cover the upstream customer wait time and the downstream customer demand variations plus stockage objectives sufficient to cover assignable surge or event driven variation requirements.

A safety level is normally identified and stocked as the major component of the target buffer. In some embodiments of the present system, this is referred to as the variation objective. The variation objective exists to cover the random variations in both upstream customer wait time and downstream customer demand. In the system, variation objective does not cover variations in customer demand that are seasonal or event driven. These are covered by a surge objective. The surge objective drives the optimum trade-off between acceptable stockouts, capacity changes, and surge inventory carrying costs.

In traditional systems, variation objective should be at least twice the lead time objective for at least two reasons. First, physical expediting is necessary to keep a few releases from falling in the far right end of the replenishment lead time distribution curve. If a target buffer contains sufficient inventory to cover three times the standard lead-time objective, the expediting signal can be raised when one-third of the inventory remains and the process lead-time will still permit receipt of replenishment just before the buffer runs out of stock, with minimum expediting effort and production line disruption. This minimizes the need for disruptive physical expediting when the system will take care of the problem on its own and it leaves just enough time to physically expedite by only ensuring a replacement release is made from the upstream target buffer. The expedite can then be tracked through work-in-progress, but physical expediting should not be required while in work-in-progress.

Second, The SC section should contain sufficient inventory to cover the remaining worse case scenarios and demand variation. In some embodiments, traditional supply chains require sufficient inventory to cover about three times the average lead-time objective and about three times the average demand. Frequently inventory policies provide for even greater inventories. Therefore establishing the variation objective at twice the lead-time objective gets in the same general amount for replenishment lead time and can then require additions of sufficient additional variation objective to cover the upside customer demand variations. The system's objective or strategy is to minimize the total variation objective requirements while minimizing the lead-time objective variations. Together, these actions minimize replenishment lead-time and customer demand variations which eliminates the need for virtually all of the standard safety stocks not driven by large batches.

End of Distribution Curve Stockade Parameter

In some embodiments, the end of distribution curve parameter permits setting fixed stockage objectives. However, high end of distribution curve values are undesirable because this is a return to the reorder point strategy that is a major cause of unwanted supply chain variation.

Make, Order, and Ship Strategies

In some embodiments, the SC section manager generates make and order needs by balancing the SC section while honoring the two internal constraints of batch size and available capacity. The supply chain manager then can balance the entire supply chain, permitting the downstream SC section managers to request only what is available and the upstream SC section Managers to distribute shortage SKUs in a balanced manner to honor the third constraint of upstream supply availability and thus optimize total supply chain performance. In some embodiments, the make and ship recommendations are picking lists and shop packets while the order recommendations are purchase orders. The picking list is used for picking the components or raw material for the next system cycle from a local buffer and the shop packet is used for sequencing the jobs on the shop floor. These system outputs are prioritized release lists that are executed by release points at each strategic buffer. The system's output is a prioritized list of SKUs that should next be picked from the release point of an upstream target buffer and placed immediately into production on the downstream gating process gating process or control point. There are a number of different strategies both for generating and using the make, order, and ship recommendations.

In some embodiments, it is desirable to generate picking list, shop packet, and purchase order, short, batch constrained requirement, capacity constrained requirement, and available capacity constrained requirement quantity recommendations Capacity constrained requirement is the "need" quantity to order, ship, or launch and is constrained by internal SC section batching rules, available capacity, and required capacity per SKU. Available capacity constrained requirement is the amount of the capacity constrained requirement that is the "available" quantity from upstream for release so it is available to order or launch this quantity immediately. This quantity is known only after the supply chain manager balances the entire supply chain. While the available capacity constrained requirement is the intended launch quantity, the other shortages can be used to assist with substitutions and optimize performance.

In some embodiments, it is important to generate picking list, shop packet, and purchase order recommendations with physical and/or virtual SC sections:

Split the set of SC section SKUs into two virtual SC sections with one SC section generating requirements for an upstream SC section that is for picking list items only and the other downstream SC section generating requirements for a second upstream SC section that is for purchase order items only.

Or, set up two upstream SC sections to supply the same SKUs to a single downstream SC section. One upstream SC section is only a picking list receiving SC section and the other is only a purchase order receiving SC section. In some embodiments, system allocation factors can be used to establish the percentage of each capacity constrained requirement that goes to each upstream SC section.

In some embodiments, the ultimate picking list make strategy generates a picking list of components or raw materials for a physically adjutant SC section that honors both the internal available capacity and external supply availability. Otherwise, a picking list that consumes all available capacity results in lost available capacity if any picking list SKUs are in short supply. To avoid this problem the SC section manager and the supply chain manager should each run their respective system balance commands before the picking list is generated.

In some embodiments, the substitute picking list make strategy does not require balancing across the supply chain, but permits additional information to be utilized on the picking list to substitute additional quantities of listed SKUs for shortages discovered upon picking. As an alternative, extra available capacity can be included in the system run to generate sufficient extra pick quantities to substitute for quantities found to be out of stock. Quantities picked this cycle show up as work-in-progress on the next cycle and the process is repeated.

In certain embodiments, the ultimate shop packet make strategy utilizes the same picking list also serves as a shop packet that enables the constraint or control process manager to sequence required work for minimum changeover capacity losses while meeting essential requirements. Again, the SC section supervisor can inflate the available capacity to give the picker and process owner more prioritized choices that exceed the real available capacity. The additional information on the picking list/shop packet prevents over picking or production and facilitates making good substitutions.

The ultimate purchase order strategy eliminates traditional purchase orders as it reaches upstream across a shipping SC section. Instead, the total short, batch constrained requirement, or capacity constrained requirement quantity is passed upstream automatically and the upstream partner notifies the downstream partner electronically of the verified release quantity at the time of verified release. The downstream partner uses the notification to establish a purchase order or due-in. This eliminates the excess order quantities the upstream partner normally should work through while providing the small portion of the order that is needed soon and delaying meeting needs of other customers. Like forecasts and large production batches, traditional purchase orders are large generators of wasted capacity, inventory, the bullwhip effect, expedites, and stock outs.

In still another embodiment, the substitute purchase order strategy retains the traditional purchase orders, but only orders the CCR-OK quantities that are available upstream after the supply chain manager balances the entire supply chain. The short and/or batch constrained requirement needs are communicated separately to upstream partners for use as they see fit. If neither the ultimate or substitute purchase order strategy are used, more time will be required for the system to balance the supply chain.

The ultimate picking list ship strategy honors the constraint of supply availability and ships shortage quantities in a balanced days of supply manner that keeps all customers in stock for as long as possible when demand exceeds supply. This is in sharp contrast to traditional practices of keeping high priority customers fully in stock even if low priority customers run out of stock. The supply chain manager should balance across the supply chain to generate optimum ship recommendations.

In some embodiments, the alternative picking list ship strategy retains traditional customer prioritizations through the allocation down strategy in which the priority strategy most valuable to the entire supply chain is to set the priority to the default value of "0." Available inventory is then allocated on a balanced days of supply basis to keep every SC section in stock. However, the traditional priority allocation system can be used by setting the priority to values greater than "0" where lower numbers indicate higher priority for filling to target levels first.

Attaining the Business Goal Through System Synchronized Scheduling and the Traditional Implementation of Constraints, Lean, or Six Sigma based Improvements The business goal is to maximize revenue while reducing total costs across the collaborative supply chain. At the highest and simplest level this means maximizing throughput. In some embodiments, throughput can refer to the rate at which operating expenses convert money invested in inventory into new money through sales. From a supply chain execution standpoint the throughput time required to convert money invested in inventory is an important component of the throughput equation and a driving metric for the entire supply chain. In one embodiment of the present disclosure, the system's synchronized scheduling across the supply chain coupled with fast-turn manufacturing collectively enable the achievement of the business goal through the three objectives of maximizing revenue by minimizing stock outs in the terminal tier of the supply chain, minimizing inventories and inventory investments across the supply chain, and minimizing operational and manufacturing costs.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only and is not intended to limit the disclosure so further described in such appended claims.

What is claimed is:

1. A computer implemented method for synchronizing ordering, production, and distribution across a supply network comprising:

defining, by a processor, one or more supply chain sections across a supply network, each supply chain section comprising a series of processes and non-strategic buffers, a strategic target buffer, and a process constraint, and a group of items, each supply chain section being defined by beginning and end points determined by considering optimum locations for each strategic target buffer, each process constraint, and natural breaks in the each series of processes and non-strategic buffers as defined by one or more bills of materials, and each group of items across the supply network, said beginning and end points for each supply chain section being defined, by said processor, by steps in each bills of materials, each process constraint comprising lowest process capacity within each supply chain section or component availability from other upstream supply chain sections, each strategic buffer being defined as the buffer at the end of each series of processes and non-strategic buffers within each supply chain section, and each group of items being defined as those that pass through the constraint processes of each supply chain section;

inputting data into a computer system, the data comprising each supply chain section, the process constraint of each supply chain section, items in each supply chain section, status, demand forecast information, batch rules, capacity requirements, available constraint capacity, and user-specified target inventory levels and lead-times for the items in each supply chain section in days of supply and;

managing the entire supply network by utilizing the computer system to generate make, order, and ship recommendations for each item in each supply chain section based upon the data, the computer system recommendations being capable of maintaining the target inventory level in days of supply for each item in each supply chain section while honoring the inputted batch rules and available constraint capacity.

2. The method of claim 1, wherein the process constraints comprise a measurable constraint comprising one or more of cash to spend, credit, cubic feet, weight, labor time, and machine hours.

3. The method of claim 1, further comprising:
utilizing the computer to maintain target inventory level in days of supply for each item in each supply chain section based upon inventory status and the demand forecast for the item.

4. The method of claim 1, further comprising:
utilizing the computer system to generate a batch and capacity constrained make, order, or ship requirement for each item in each supply chain section.

5. A computer-implemented method to manage ordering, manufacturing and distributing across a supply network, said method comprising the steps of:

determining, by a processor, an ordered set of one or more mutually exclusive supply chain sections, each supply chain section comprising a managed, ordered process-buffer pair whose buffer contains a group of related products outputted from the process; where said process is one of an indivisible process or an ordered set of unmanaged process-buffer pairs; where a set of candidate supply chain sections is identified containing the most restrictively constrained processes within the supply network; and where the supply chain sections from within the set of candidates are identified, such that the cost/benefit ratio of managing each supply chain section having a divisible process is less than the ratio for managing one or more of the process-buffer pairs in the ordered set comprising that process;

inputting data into a computer system, said data comprising: for each product one or more of product identifier, inventory status, batching rules, demand forecast, user-specified target inventory level in days-of-supply, fixed-stockage quantity overrides, required constraint capacity, cost, process groups, lead-times, processing yields, and supply chain section identity, and; values of constraints on each process that limit process capacity comprising one or more of credit, volume, weight, labor time, rates, quantities, machine hours, process time, availability of components, and cash;

managing the supply network based upon said data by utilizing the computer system to recommend, subject to said constraints, for each product in each supply chain section a quantity to order, manufacture, or distribute, to return inventory level to the target inventory level, while minimizing the standard deviation of all inventory levels from target inventory levels, where the inventory level accounts for amounts comprising one or more of on hand, on order, scheduled for production, in process, in transit, due in, and due out.

* * * * *